(12) United States Patent
Keller et al.

(10) Patent No.: US 9,750,115 B2
(45) Date of Patent: Aug. 29, 2017

(54) INTERFACE MODULE FOR POWERING WIRELESS USER INTERFACE THROUGH LIGHT SWITCH

(71) Applicant: Robert Bosch GmbH

(72) Inventors: Brent Andrew Keller, Rochester, NY (US); Alex Khazanov, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 14/603,505

(22) Filed: Jan. 23, 2015

(65) Prior Publication Data

US 2016/0219680 A1     Jul. 28, 2016

(51) Int. Cl.
| | | |
|---|---|---|
| B23K 11/24 | (2006.01) | |
| H05B 37/02 | (2006.01) | |
| H02G 3/12 | (2006.01) | |

(52) U.S. Cl.
CPC ........... *H05B 37/0272* (2013.01); *H02G 3/12* (2013.01)

(58) Field of Classification Search
CPC ............................. H05B 37/0272; H02G 3/12
USPC ....................................................... 307/112
See application file for complete search history.

(56) References Cited

U.S. PATENT DOCUMENTS

| 8,299,719 B1 | 10/2012 | Moshirnoroozi | |
|---|---|---|---|
| 2010/0214756 A1* | 8/2010 | Feldstein | H01H 9/0271 361/807 |
| 2013/0270097 A1* | 10/2013 | Cheng | H03K 17/962 200/600 |
| 2015/0382436 A1* | 12/2015 | Kelly | G08C 17/02 315/131 |

FOREIGN PATENT DOCUMENTS

| DE | 19945200 | 3/2001 |
|---|---|---|
| EP | 2073335 | 6/2009 |
| KR | 20130043391 | 4/2013 |

OTHER PUBLICATIONS

Honeywell, LYNX Touch Security System, User Guide, Jan. 1, 2011, Rev. A, 80 pages.
International Search Report and Written Opinion for Application No. PCT/EP2015/079085 dated Mar. 3, 2016 (11 pages).

* cited by examiner

*Primary Examiner* — Jared Fureman
*Assistant Examiner* — Duc M Pham
(74) *Attorney, Agent, or Firm* — Michael Best & Friedrich LLP (57) ABSTRACT

An interface module is described for replacing a light switch assembly in an electrical switch box, the electrical switch box having an input wire coupled to a power source, an output wire coupled to a first lighting device, and at least one threaded bore. The interface module includes a housing, a first terminal mounted on the housing and connected to the input wire, a second terminal mounted on the housing and connected to the output wire, a first switch component configured to activate and deactivate the lighting device, a control configured to operate the first switch component, a user interface coupleable to the first terminal to receive operating power, and a wireless transmitter configured to transmit signals indicative of inputs received through the user interface, the wireless transmitter being configured to receive power from the first terminal.

19 Claims, 6 Drawing Sheets

INTERFACE MODULE FOR POWERING WIRELESS USER INTERFACE THROUGH LIGHT SWITCH

BACKGROUND

The present invention relates to devices, such as user interfaces for a security system, and mechanisms for powering such devices. Some security systems are controlled through a user interface that includes a keypad and that wirelessly communicates with the security system control. Such devices can be battery powered to allow for convenient physical placement. However, because such devices have high demands for power, the batteries require frequent replacement and/or recharging. Even if the device is positioned with an outlet nearby, a cable may have to be run from the user interface to the outlet to power the user interface, resulting in an aesthetically displeasing presentation.

SUMMARY

In various embodiments, the systems and methods described herein provide a mechanism for powering a user interface by replacing a light switch assembly with an interface module that installs within a standard in-wall electrical switch box footprint. The interface module includes a manually operatable switch as well as a mechanism for powering the user interface module.

In one embodiment, the invention provides an interface module for replacing a light switch assembly in an electrical switch box. The electrical switch box has an input wire coupled to a power source, an output wire coupled to a first lighting device, and at least one threaded bore. The interface module includes a housing positionable within the electrical switch box, a first terminal mounted on the housing and configured to connect to the input wire, and a second terminal mounted on the housing and configured to connect to the output wire. The interface module also includes a first switch component positioned within the housing, the first switch component being coupled to the housing between the first terminal and the second terminal and configured to activate and deactivate the first lighting device when the second terminal is connected to the output wire, and a control configured to operate the first switch component. Further, the interface module includes a user interface configured to receive operating power from the power source through the first terminal when the first terminal is connected to the input wire and a wireless transmitter coupled to the user interface and configured to transmit signals indicative of inputs received through the user interface, the wireless transmitter being configured to receive operating power from the power source when the first terminal is connected to the input wire.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
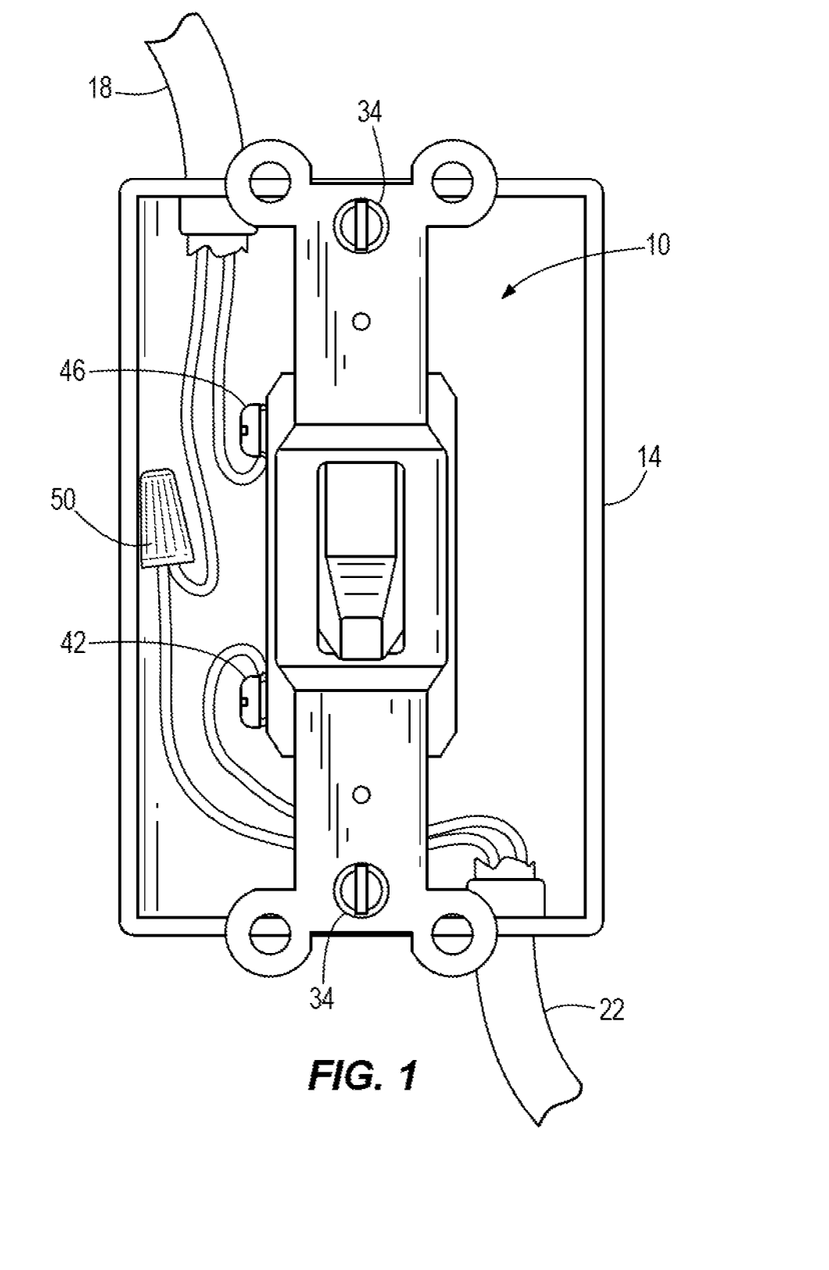
FIG. 1 is a front view of a light switch assembly in an electrical switch box.

FIG. 1 illustrates a light switch assembly 10 positioned within an electrical switch box 14 mounted to a wall after removal of a switch plate or outlet cover. The wall-mounted electrical switch box 14 includes a 120 V AC output wire 18 and a 120 V AC input wire 22 within the wall and located within a periphery of the electrical switch box 14. The electrical switch box 14 also includes a pair of threaded bores 34. The input wire 22 is coupled to a power source (not shown) of a residential or commercial building. The electrical switch box 14 is configured for providing power from the 120 V AC output wire 18 to a first lighting device (not shown) located within the building.

The light switch assembly 10 includes two cylindrical bores and is coupled to the electrical switch box 14 via a pair of mounting screws threaded through the cylindrical bores of the light switch assembly 10 and the threaded bores 34 of the electrical switch box. An on-off mechanism is centrally located on the light switch assembly 10 which protrudes through an opening in the switch plate when the switch plate covers the electrical switch box 14. The light switch assembly 10 is connected to the input wire 22 and the output wire 18 via a pair of wire terminals 42, 46 using various wires and a wire nut 50. Actuation of the on-off mechanism toggles power from the input wire 22 to the output wire 18 to activate and deactivate the first lighting device.

Figure 2:
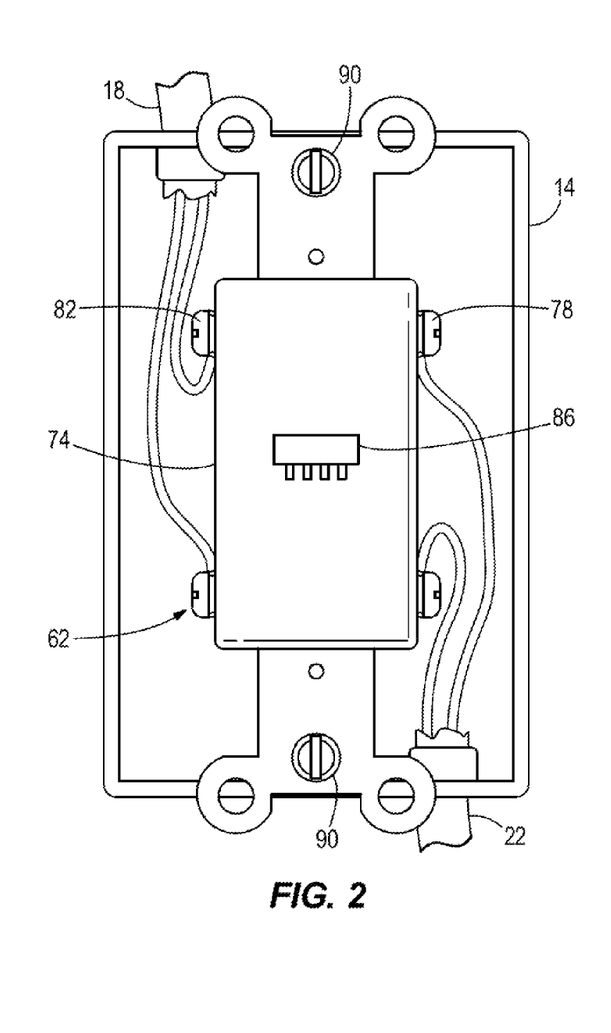
FIG. 2 is a front view of an interface module for replacing the light switch assembly positioned within the electrical switch box of FIG. 1, with a user interface and a control of the interface module decoupled from the interface module.

In the example of FIG. 2, the light switch assembly 10 of FIG. 1 has been replaced with an interface module 62 mounted within the standard electrical switch box 14. The interface module 62 includes a first housing 74, a first terminal 78 mounted on the first housing 74 and connected to the input wire 22, and a second terminal 82 mounted on the first housing 74 and connected to the output wire 18. Various other wires and terminals are provided for a connection from the output wire 18 to ground. The interface module 62 includes an accessory connector 86 mounted on the first housing 74 which protrudes outwardly from the first housing 74 and is selectively coupleable to a user interface as discussed below. The interface module 62 further includes a pair of openings 90 coupleable to the threaded bores 34 of the electrical switch box 14 via mounting screws and configured to position the first housing 74 within the electrical switch box 14. As such, the interface module 62 can be installed by removing the light switch assembly 10 and replacing it with the interface module 62 within the same wall-mounted electrical switch box 14.

Figure 3:
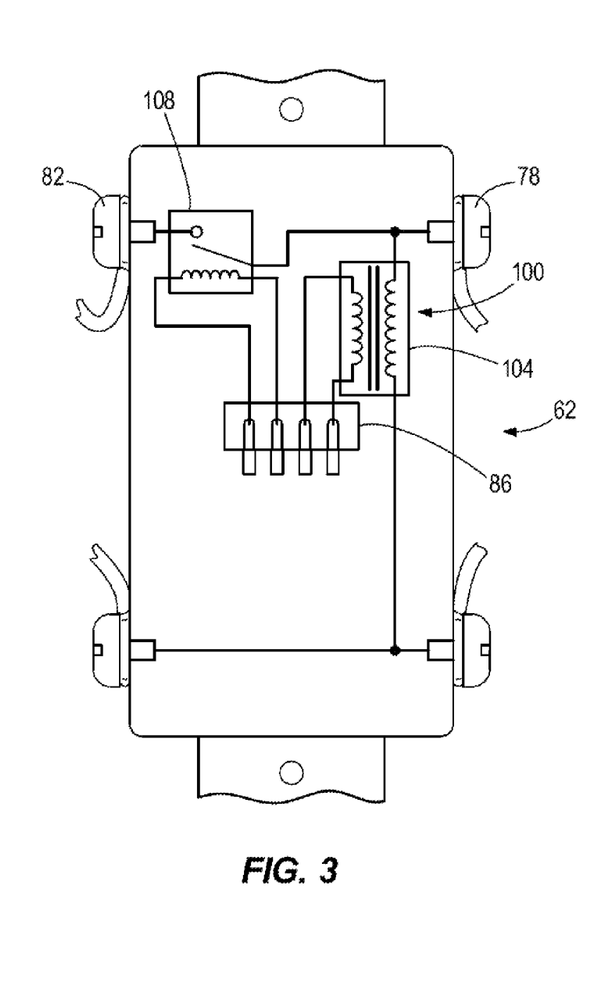
FIG. 3 is a schematic diagram of the interface module of FIG. 2.

FIG. 3 is a schematic illustration of the circuitry of the interface module 62. The interface module 62 includes a circuit 100. The components of the circuit 100 are coupled to the first housing 74 and positioned within the first housing 74. The components of the circuit 100 are hidden behind the first housing 74 in FIG. 2. The circuit 100 includes a transformer 104, the accessory connector 86, and a first switch component 108 (e.g., a relay, a multiway switch) coupled to the first housing 74 between the first terminal 78 and the second terminal 82, with wires connecting the various components. The transformer 104 is configured to direct power from the power supply (e.g., provide operating power from the power supply) to the accessory connector 86 and/or the wireless transceiver 140. The operating power provided by the transformer 104 may be at a voltage lower than that provided by the power source (e.g., at a voltage lower than the 120 V provided by the input wire 22). In some constructions, the circuit 100 includes a switch-mode power supply.

Figure 4:
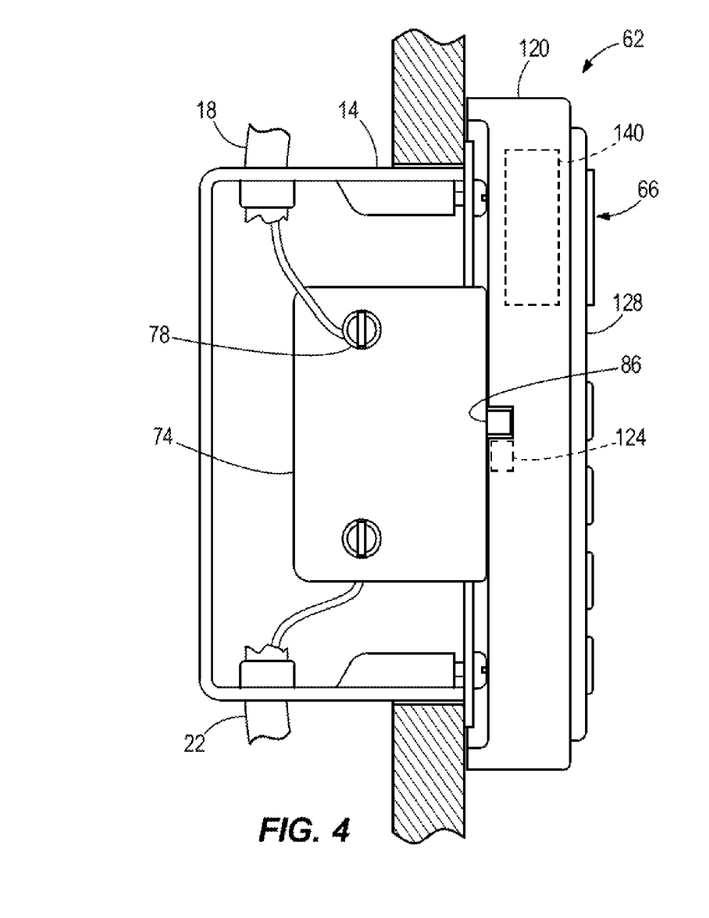
FIG. 4 is a side view of the interface module of FIG. 2 positioned within the electrical switch box.

FIG. 4 shows the wall mounted interface module 62 with a second housing 120 including a user interface 66. The second housing 120 is coupled to the accessory connector 86. In the example of FIG. 4, the user interface 66 includes a keypad and a digital display mounted on the second housing 120. In other constructions, the user interface can take other forms, such as, for example, a touchscreen device. The second housing 120 is coupled to the accessory connector 86 by a user interface connector 124. Further, the user interface 66 is configured to receive power from the input wire 22 through the accessory connector 86, the user interface connector 124, and the respective housings 74, 120. The user interface 66 includes a wireless transceiver 140 coupled to the user interface 66 and contained within the user interface 66. The wireless transceiver 140 is configured to receive inputs from the user interface 66 and to wirelessly communicate with a remote system (as described further below). The wireless transceiver 140 receives its operating power from the power source via the input wire 22 in the same manner as the user interface 66. Although the example of FIG. 4 shows the wireless transceiver 140 positioned within the second housing 120, in some constructions, the wireless transceiver 140 is positioned within the first housing 74 and communicates with the user interface 66 only when the user interface 66 is physically coupled to the accessory connector 86. In either case, the wireless transceiver 140 remains configured to receive power from the input wire 22. In other constructions, the wireless transceiver 140 is replaced with a wireless transmitter that is capable only of one-way communication with the remote system. Additionally, other constructions may include the user interface 66 in the first housing 74, which may eliminate the need for the second housing 120, the accessory connector 86, and the user interface connector 124.

Figure 5:
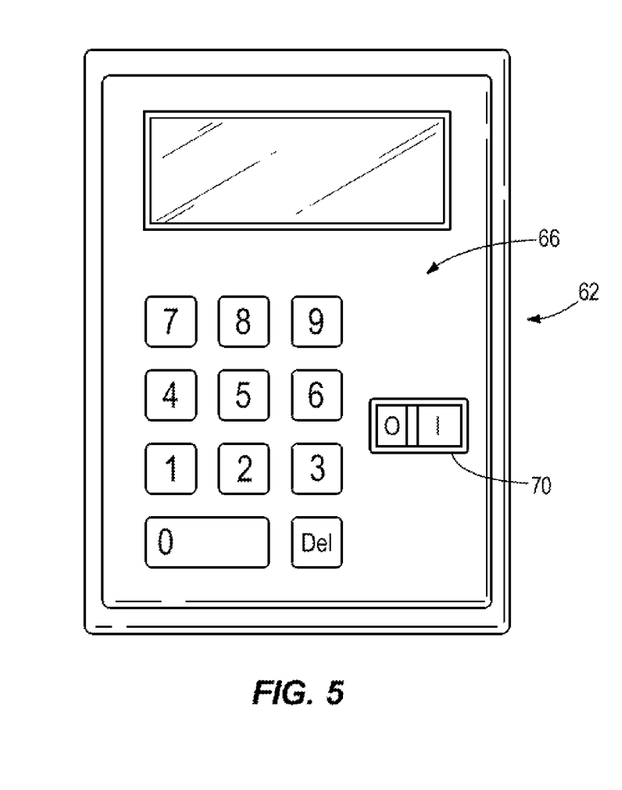
FIG. 5 is a front view of the interface module of FIG. 2 showing the user interface and the control of the interface module.

FIG. 5 shows a front-view of the user interface 66. The user interface 66 includes a keyboard and a digital display (as discussed above) and also includes a switch control 70 (i.e. an on-off switch) adjacent the user interface 66. Like the switch of the light switch assembly 10 of FIG. 1, the switch control 70 is configured to control the operating state of the lighting device based on the manually actuated position of the switch control 70 (e.g., manually changing the position of the switch control 70 alters the state of the first switch component 108).

Although the example interface module 62 illustrated in FIGS. 2-5 describes a user interface 66 that mounts on the exterior of the wall-mounted electrical switch box 14, in other configurations, the user interface 66 may be mounted adjacent the electrical switch box 14 on the wall and connected to the input wire 22 and output wire 18 via wiring inside the wall. In such a configuration, a switch plate without any operable elements may be coupled to the electrical switch box 14 to shield the electrical components. Alternatively, a standard switch control can be mounted on the exterior surface of the first housing 74 and the accessory connector can be mounted on a side surface of the first housing such that the electrical coupling between the second housing 120 and the first housing 74 is hidden within the interior of the wall.

Figure 6:
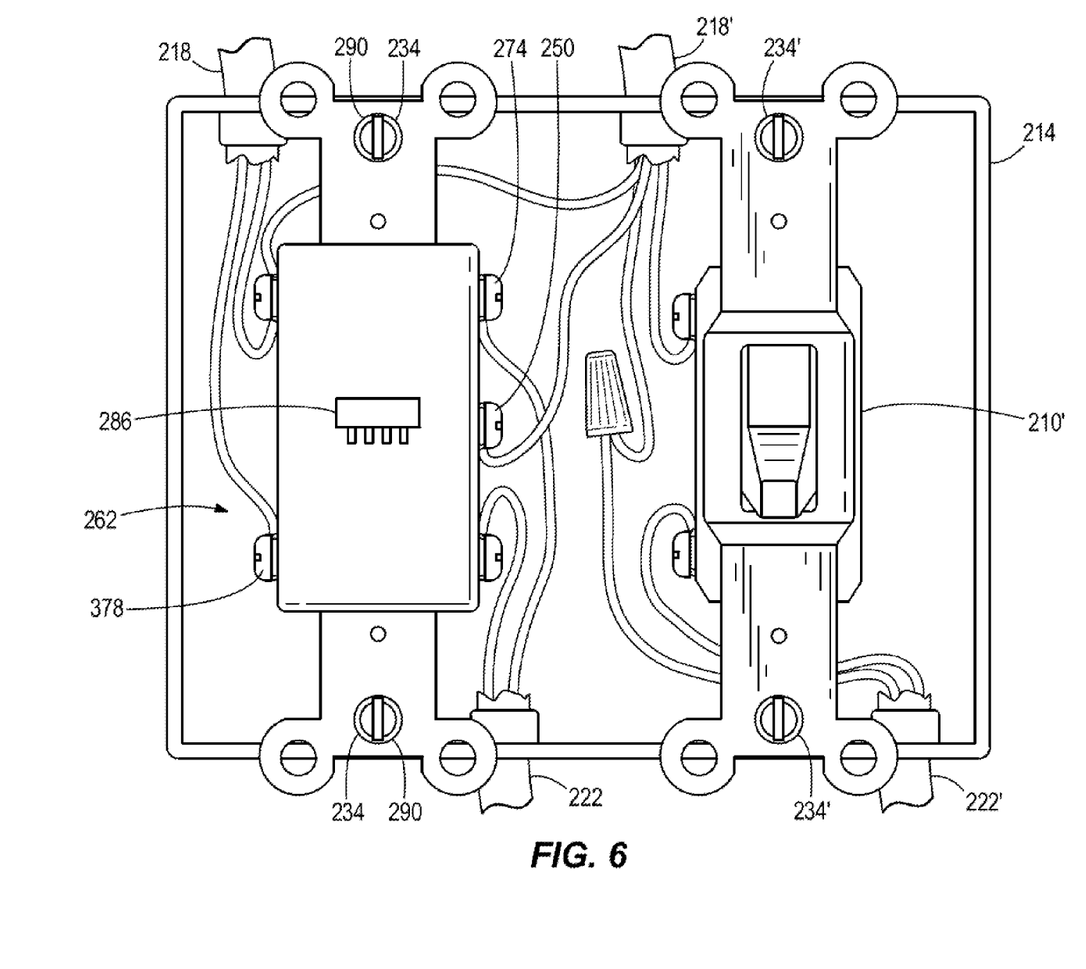
FIG. 6 is a front view of another embodiment of an interface module positioned in an electrical switch box assembly having two input and output wires, with a user interface and a control decoupled from the interface module.

FIG. 6 illustrates another example of an electrical switch box 214 mounted in a wall after removal of the switch plate, with like parts given similar numbers (i.e., increased by 200) and having similar functions. The electrical switch box 214 is positioned within the wall and configured to hold two light switch assemblies that will be used to operate first and second lighting devices (not shown). The electrical switch box 214 includes two pairs of threaded bores 234, 234', in addition to first and second 120 V AC input wires 222, 222' and first and second 120 V AC output wires 218, 218' mounted in the wall and located within the periphery of the electrical switch box 214. The first 120 V AC output wire 218 is connected to the first lighting device and the second 120 V AC output wire 218' is connected to the second lighting device. Further, various other wires and terminals are provided for a connection from the output wire 218 to ground. The electrical switch box 214 is configured to accommodate a first light switch assembly (not shown) and a second light switch assembly 210' in a manner as described above in regard to FIG. 1. In other electrical switch boxes 214, other controllable devices can be configured for control via the output wires 218, 218' (e.g., ceiling fans).

Like the example discussed above in reference to FIG. 2, the interface module 262 couples to the electrical switch box 214 via mounting screws threaded through openings 290 of the interface module 262 and into the first pair of threaded bores 234 of the electrical switch box 214 such that the interface module 262 is positioned over an area vacated by the first light switch assembly. The interface module 262 includes a first housing 274, and a first terminal 274, a second terminal 278, a third terminal 250, and an accessory connector 286 mounted on the first housing 274. The first terminal 274 is connected to the first input wire 22, the second terminal 378 is connected to the first output wire 218, and the third terminal 250 is connected to the second output wire 222'. The interface module 262 further includes first and second switch components (not shown) positioned within the first housing 274 with the second switch component coupled to the third terminal 250. When a second housing and a user interface (not shown) are coupled to the accessory connector 286, the first and second switch components are operable via first and second controls of the user interface to activate and deactivate the first and second lighting devices. Further, when the second housing is coupled to the accessory connector 386, the user interface and a transceiver of the user interface may draw power from the input wire 322 through the accessory connector 386.

In the illustrated embodiment, the second light switch assembly 210' may be removed and a switch plate without any operable elements may be coupled via mounting screws to the second pair of threaded bores 234' to cover the electrical components. In another construction, the interface module 262 does not have a third terminal 250 and instead is configured in the same manner as the interface module 62 of FIGS. 2-5 (i.e., is not connected to the second lighting device). In such an embodiment, a switch plate with an opening for an on-off switch of the second light switch assembly 210' is provided so a user may activate and deactivate the second light switch assembly 210' (which remains positioned within the electrical switch box 214).

Figure 7:
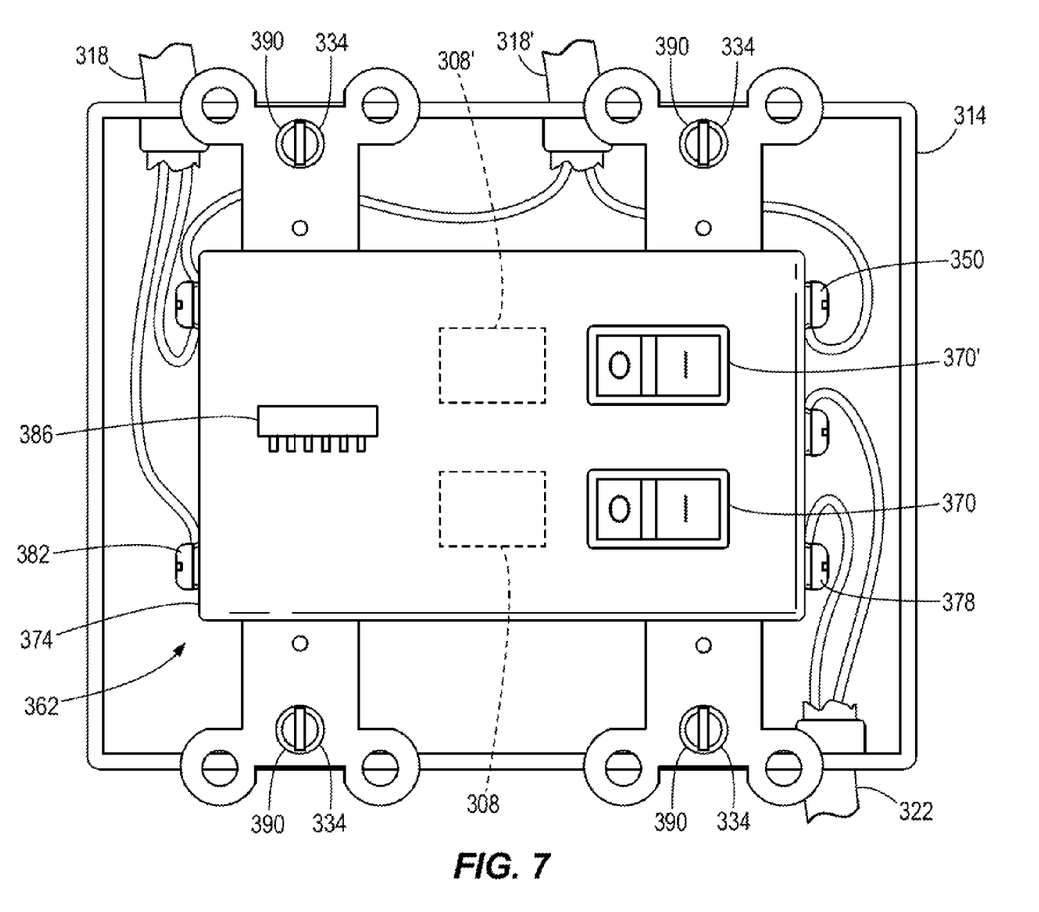
FIG. 7 is a front view of another embodiment of an interface module positioned in an electrical switch box assembly having one input wire and two output wires, with a user interface and a control decoupled from the interface module.

FIG. 7 illustrates another embodiment of an interface module 362 with like parts given similar numbers (i.e., increased by 100 from the embodiment in FIG. 6) and having similar functions. The interface module 362 is configured to replace a light switch assembly in an electronic switch box 314 that includes a single input wire 322 connected to a power source (not shown), and first and second output wires 318, 318' connected to first and second lighting devices (not shown). Various other wires and terminals are provided for a connection from the output wire 318 to ground. Like the example discussed above in reference to FIG. 6, the interface module 362 couples to the electrical switch box 314 via mounting screws threaded through openings 390 of the interface module 362 and into the first pair of threaded bores 334 of the electrical switch box 314 such that the interface module 362 is centered over the electrical switch box 314. The interface module 362 includes a first housing 374 on which are mounted a first terminal 378, a second terminal 382, a third terminal 350, first and second controls 370, 370', and an accessory adaptor 386. The interface module 362 further includes first and second switch components 308, 308' positioned within the first housing 374 and coupled to the first housing 374. The first terminal 378 is connected to the input wire 322, the second terminal is connected to the first output wire 318, and the third terminal 350 is connected to the second output wire 318'. The first and second switch components 308, 308' are configured to activate and deactivate the first and second lighting devices upon operation of the controls 370, 370'. When a second housing and a user interface (not shown) are coupled to the accessory connector 386 through a user interface connector of the second housing, the user interface and a transceiver located within the housing (not shown) may draw power from the input wire 322 through the accessory connector 386 and the user interface connector. In other embodiments not shown, the first and second switches 370, 370' include first and second switch components which are directly toggled by operation of the first and second switches 370, 370'.

Figure 8:
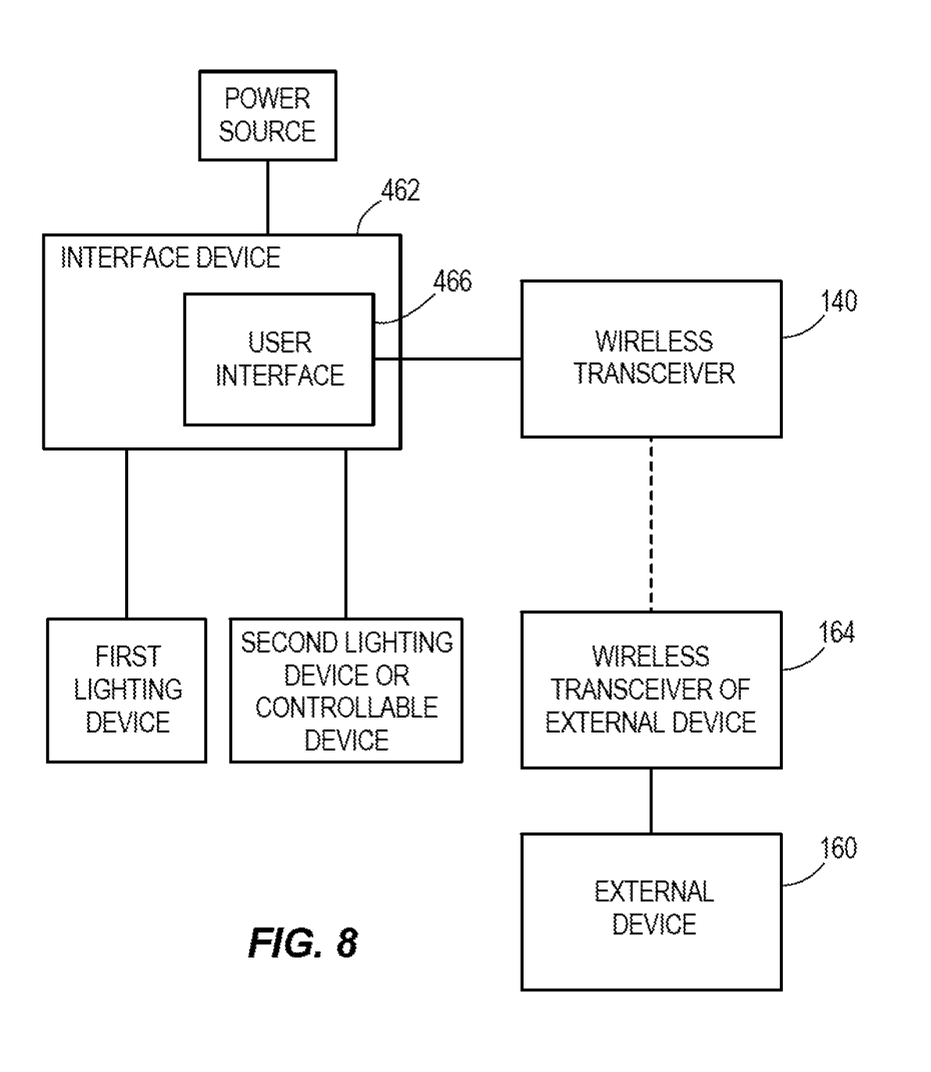
FIG. 8 is a block diagram of the user interface modules of any of FIGS. 2-7 communicating with one or more external devices.

As shown in FIG. 8, inputs received through a user interface 466 of an interface module 462 cause signals to be transmitted to one or more external devices 160 via a wireless transceiver 140. The shown external device 160 includes an external wireless transceiver 164 for receiving signals from the wireless transceiver 140. The wireless transceiver 140 also receives signals from the external device(s) 160 (e.g., through the external wireless transceiver 164) and displays information on the user interface 466 based on the received signals. The user interface 466, as shown, is part of an interface module 462 which is powered by a power source and operable to control a first lighting device and a second lighting device or a controllable device.

The user interface 66 may be used as a security code input device for a building's security system. A user may enter a security code through the keypad to enable or disable the security system, to gain entrance into a building, or to open a corresponding door. When the proper security code is entered into the user interface 66, the display screen might display "Access Granted" as the corresponding door is opened.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention.

Thus, the invention provides, among other things, an interface module for replacing a light switch assembly in an electrical switch box that is configured to allow operation of a control to actuate a lighting device through an output wire, and to allow a user interface and wireless transmitter to operate using the power from an input wire of the electrical switch box. Various features and advantages of the invention are set forth in the following claims.

What is claimed is:

1. An interface module for replacing a light switch assembly in an electrical switch box, the electrical switch box including an input wire coupled to a power source, an output wire coupled to a first lighting device, and at least one threaded bore, the interface module comprising:
   a housing positionable within the electrical switch box;
   a first terminal mounted on the housing and configured to connect to the input wire;
   a second terminal mounted on the housing and configured to connect to the output wire;
   a first switch component positioned within the housing, the first switch component being coupled to the housing between the first terminal and the second terminal and configured to activate and deactivate the first lighting device when the second terminal is connected to the output wire;
   a control configured to operate the first switch component;
   a user interface configured to receive operating power from the power source through the first terminal when the first terminal is connected to the input wire; and
   a wireless transmitter coupled to the user interface and configured to transmit signals indicative of inputs received through the user interface, the wireless transmitter being configured to receive operating power from the power source when the first terminal is connected to the input wire.

2. The interface module of claim 1, wherein the user interface includes a touchscreen device.

3. The interface module of claim 1, wherein the wireless transmitter is configured to transmit the signals indicative of inputs received through the user interface to one or more external devices.

4. The interface module of claim 3, wherein the interface module includes a wireless transceiver, the wireless transceiver including the wireless transmitter, wherein the wireless transceiver is configured to receive signals from the one or more external devices and the user interface is configured to display signals from the one or more external devices.

5. The interface module of claim 3, wherein the one or more external devices includes a security system.

6. The interface module of claim 3, wherein the one or more external devices includes a computer or computer network.

7. The interface module of claim 1, wherein the first switch component includes a relay.

8. The interface module of claim 1, wherein the first switch component includes a multiway switch.

9. The interface module of claim 1, wherein the control includes an on-off switch control configured to manually change a state of the first switch component.

10. The interface module of claim 1, wherein the user interface is mountable adjacent to the electrical switch box.

11. The interface module of claim 1, further comprising a circuit contained within the housing and including a transformer configured to produce a current directed to the user interface.

12. The interface module of claim 1, wherein the wireless transmitter is positioned in the housing.

13. The interface module of claim 1, further including at least one opening positioned to align with the at least one threaded bore when the housing is positioned within the electrical switch box.

14. The interface module of claim 1, further including a transformer configured to provide operating power from the power source to the user interface and the wireless transmitter at a voltage different than the voltage provided by the power source.

15. The interface module of claim 1, further including a switch-mode power supply configured to provide operating power from the power source to the user interface and the wireless transmitter at a voltage different than the voltage provided by the power source.

16. An interface module for replacing a light switch assembly in an electrical switch box, the electrical switch box including an input wire coupled to a power source, an output wire coupled to a first lighting device, and at least one threaded bore, the interface module comprising:
   a housing positionable within the electrical switch box;
   a first terminal mounted on the housing and configured to connect to the input wire;
   a second terminal mounted on the housing and configured to connect to the output wire;
   a first switch component positioned within the housing, the first switch component being coupled to the housing between the first terminal and the second terminal and configured to activate and deactivate the first lighting device when the second terminal is connected to the output wire;
   a control configured to operate the first switch component;
   a user interface configured to receive operating power from the power source through the first terminal when the first terminal is connected to the input wire; and
   a wireless transmitter coupled to the user interface and configured to transmit signals indicative of inputs received through the user interface, the wireless transmitter being configured to receive operating power from the power source when the first terminal is connected to the input wire,
   wherein the electrical switch box further includes a second output wire coupled to a second controllable device, and further comprising:
   a third terminal mounted on the housing and configured to connect to the second output wire; and
   a second switch component positioned within the housing, the second switch component being coupled to the third terminal and configured to activate and deactivate the second controllable device when the third terminal is connected to the second output wire.

17. The interface module of claim 16, wherein the second controllable device includes a second lighting device.

18. An interface module for replacing a light switch assembly in an electrical switch box, the electrical switch box including an input wire coupled to a power source, an output wire coupled to a first lighting device, and at least one threaded bore, the interface module comprising:
   a housing positionable within the electrical switch box;
   a first terminal mounted on the housing and configured to connect to the input wire;
   a second terminal mounted on the housing and configured to connect to the output wire;
   a first switch component positioned within the housing, the first switch component being coupled to the housing between the first terminal and the second terminal and configured to activate and deactivate the first lighting device when the second terminal is connected to the output wire;
   a control configured to operate the first switch component;
   a user interface configured to receive operating power from the power source through the first terminal when the first terminal is connected to the input wire;
   a wireless transmitter coupled to the user interface and configured to transmit signals indicative of inputs received through the user interface, the wireless transmitter being configured to receive operating power from the power source when the first terminal is connected to the input wire; and
   a circuit contained within the housing and including a transformer configured to produce a current directed to the user interface,
   wherein the housing is a first housing, the interface module further comprising:
   a second housing, wherein the user interface is mounted on the second housing; and
   a user interface connector mounted on the second housing and coupled to the user interface,
   wherein the circuit further includes an accessory connector mounted on the first housing that is selectively coupleable to the user interface connector, and
   wherein the circuit is configured to produce a current directed to the user interface when the accessory connector is coupled to the user interface connector.

19. The interface module of claim 18, wherein the wireless transmitter is positioned in the second housing.

* * * * *